United States Patent [19]

Sanders

[11] Patent Number: 4,953,506

[45] Date of Patent: Sep. 4, 1990

[54] FEED BOWL FOR ANIMALS

[76] Inventor: Daniel T. Sanders, 1834 McJenkin Dr., NE., Atlanta, Ga. 30345

[21] Appl. No.: 184,437

[22] Filed: Apr. 21, 1988

[51] Int. Cl.⁵ .............................................. A01K 5/00
[52] U.S. Cl. ......................................................... 119/61
[58] Field of Search ...................... 119/61, 52 R, 51 R

[56] References Cited

U.S. PATENT DOCUMENTS

| | | | |
|---|---|---|---|
| 3,195,510 | 7/1965 | Bernstein | 119/61 |
| 3,441,003 | 4/1969 | DuMond et al. | 119/61 |
| 3,995,595 | 12/1976 | Williams | 119/61 |
| 4,128,080 | 12/1978 | Haney | 119/51.5 |
| 4,803,954 | 2/1989 | Welch et al. | 119/61 |

*Primary Examiner*—Gene Mancene
*Assistant Examiner*—Michael Lynch
*Attorney, Agent, or Firm*—Birch, Stewart, Kolasch & Birch

[57] ABSTRACT

An animal feeder including an elevated upper bowl portion is located on top of a sectional base portion. A generally flat circular disk having an annular moat region containing a sticky substance on the top surface is located in a recess of the base portion for trapping insects and the like as they attempt to gain access to a feeding area formed in the upper bowl portion. The base and upper bowl portion are connected together by means of a spring loaded bayonet type of interconnecting assembly.

4 Claims, 3 Drawing Sheets

FEED BOWL FOR ANIMALS

BACKGROUND OF THE INVENTION

This invention relates generally to apparatus for feeding animals and more particularly to a dish or bowl for feeding pets.

Feed trays or bowls for feeding animals are generally known. Also known are animal feeders which are comprised of two or more sections as well as bowl feeders which include means for repulsing or trapping insects seeking access to the bowl portion which is adapted to receive pet food, for example.

It is an object of the present invention, therefore, to provide an improvement in animal feeders.

It is a further object of the invention to provide an improved bowl type feeder which prevents crawling insects from entering the animal's feed and/or water supply placed in the bowl.

Yet another object of the invention is to prevent crawling insects such as roaches, centipedes, etc. from entering into a pet's feed and/or water supply and contaminating it with droppings and diseases which such insects are known to carry, and which deprives crawling insects from an easy and convenient supply of food and water.

And yet another object of the invention is to provide a pet feeder including an elevated feeding bowl which is not only simple in construction but is also attractive in appearance.

SUMMARY

The foregoing and other objects of the invention are provided by a multi-piece sectional plastic bowl feeder for pets and the like having a pressure sensitive disk including a sticky substance located on an annular outer surface area for providing a moat-like structure for inhibiting the travel of crawling insects attempting to gain access to the area containing food and water. In particular, the bowl includes a top bowl portion having a large generally circular recessed area to provide ample food and water space for an animal. Beneath the top portion there is included a centered downwardly extending male mounting post including a locking pin having a pair of outwardly extending pin end portions which are adapted to engage a pair of notched grooves in an upwardly extending post located on a lower base portion. A spring loaded piston is also included in the lower post for exerting an upward bias pressure on the male mounting post when locked into position thereon. A cylindrical spacer sleeve is adapted to fit over the base post to aid in securing the disk to the bottom of an annular recess formed in the bottom of the base.

BRIEF DESCRIPTION OF THE DRAWINGS

The following detailed description will become more fully understood when considered in conjunction with the accompany drawings in which.

DETAILED DESCRIPTION OF THE INVENTION

Figure 1:
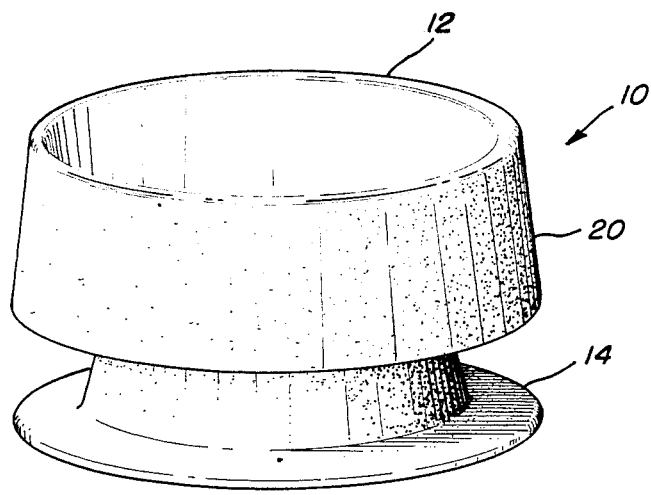
FIG. 1 is a perspective view of the preferred embodiment of the subject invention.
Figure 2:
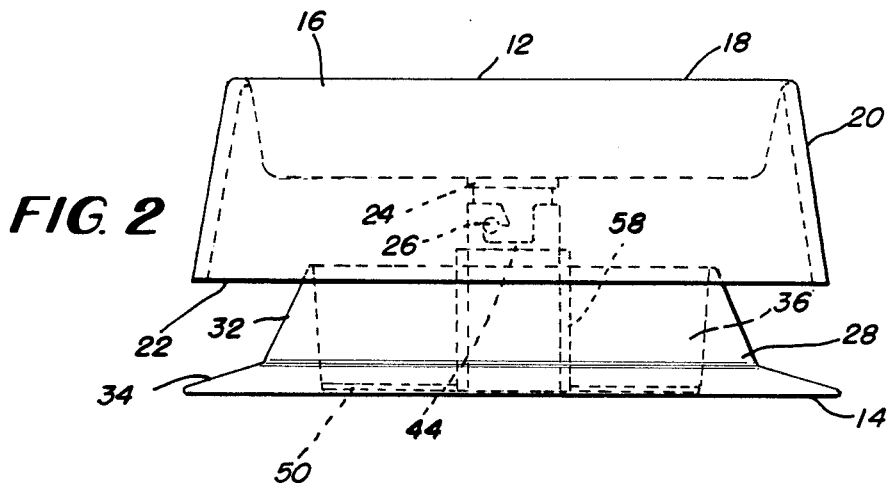
FIG. 2 is a side view generally illustrative of the details of the preferred embodiment shown in FIG. 1.
Figure 6:
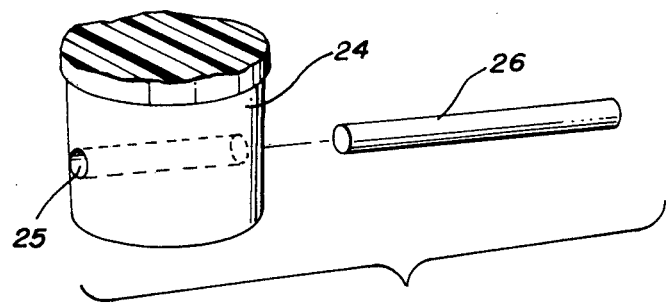
FIG. 6 is a partial cutaway perspective view of the male post member included on the bottom of the upper bowl portion shown in FIG. 3.
Figure 7:
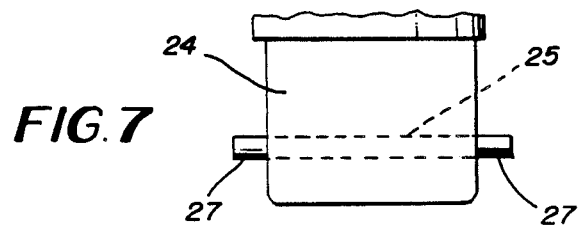
FIG. 7 is a side elevational view of the post member shown in FIG. 6.

Referring now to the drawings, the preferred embodiment of the invention comprises a generally circular bowl type assembly which is shown in FIG. 1 and includes an upper bowl portion 12 and a lower base portion 14. The upper bowl portion 12 is comprised of a circular body member formed, for example, of plastic and including an upper generally circular recess 16 formed therein and being large enough to provide ample food or water space for a typical average or above average sized dog or cat. The upper rim 18 as shown in FIG. 2 joins a downwardly and outwardly angulated side wall 20 where it terminates in a bottom rim 22. Up to this point the top bowl portion 12 resembles a conventional pet feeding dish; however, as further shown in FIG. 3, it additionally includes a generally cylindrical male type post member 24 which is located and centered on the central axis of the structure and depends downwardly for a predetermined distance but less than the location of the bottom rim 22. The post member 24 is shown comprising an integral part of the upper bowl portion 12; however, when desirable, it can be formed separately and then attached to the underside of the bowl member. An elongated solid metal pin 26, comprised of, for example, aluminum or stainless steel, is inserted through a hole 25 drilled or otherwise formed in the post member 24 as shown in FIG. 6 so that the ends 27 thereof extend a predetermined equal distance outwardly from the side surface of the post member 24 where it is then glued into place. This is shown in FIG. 7.

Figure 3:
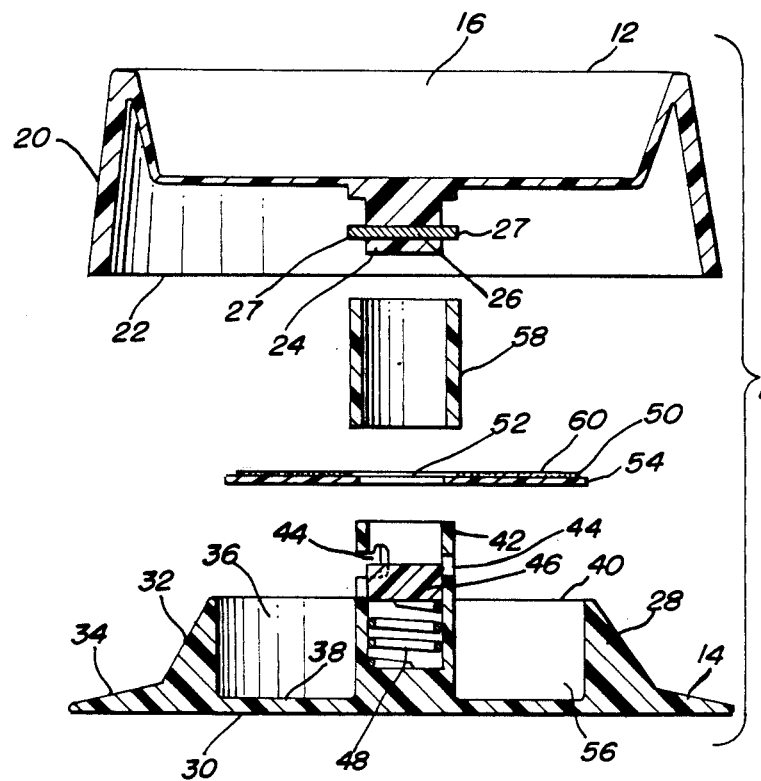
FIG. 3 is an exploded side view of the components of the preferred embodiment shown in FIG. 2.
Figure 5:
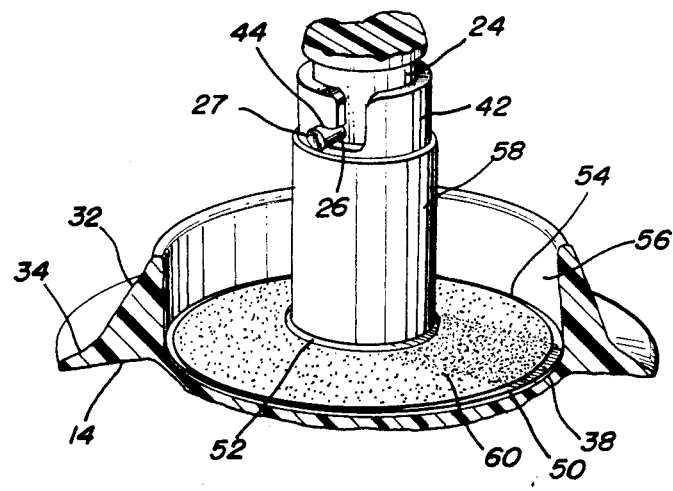
FIG. 5 is a partial cutaway perspective view of the base portion of the embodiment shown in FIG. 2 and being further illustrative of the interconnection of the top and bottom portions of the invention.

The base member 14 includes a circular body member 28 having a generally flat bottom surface 30 which is adapted to extend outwardly to a distance substantially equal to the distance across the bottom rim 22 of the upper bowl portion 12. As shown in FIGS. 2 and 3, it additionally includes a pair of angulated outer side walls 32 and 34 which form a generally concave surface configuration. A generally circular recess 36 is formed in the base 14 and includes a generally flat bottom surface 38.

Figure 8:
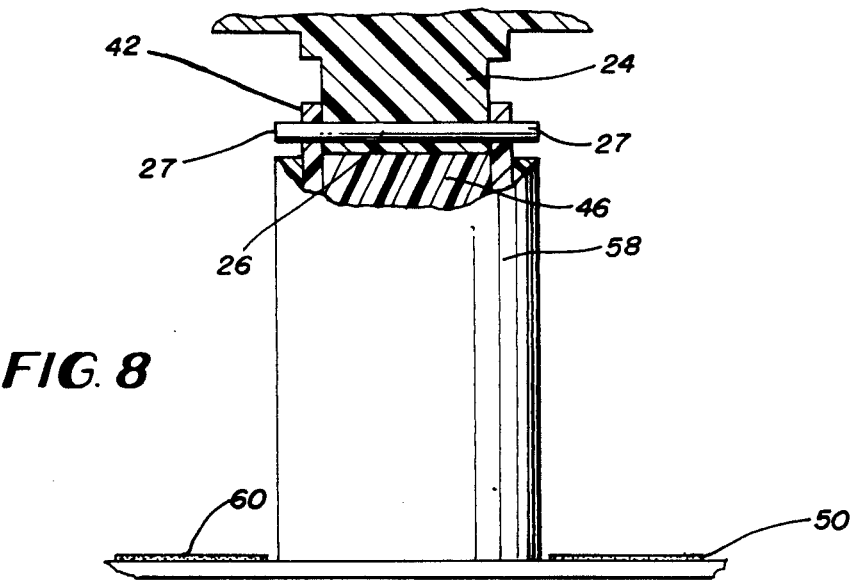
FIG. 8 is another partial cutaway perspective view of the base portion shown in FIG. 5.

Extending upwardly from the bottom surface 38 above the upper rim 40 is a centrally located cylindrical member 42 which has for its purpose the engagement with the downwardly extending post member 24 of the upper bowl portion 12. The cylindrical member 42 in effect comprises a female post member and additionally includes a pair of oposing notched grooves 44 at the upper end which are adapted to engage the outwardly extending end portions 27 of the pin 26 as shown in FIG. 8.

The lower female post member 42 additionally includes a spring loaded piston 46 which is urged upwardly by means of a compression spring 48. When the upper bowl portion 12 is lowered onto the base portion 14, the downwardly extending male post member 24 when entering the upwardly extending female post member 42, engages the spring biased cylinder 42. Interlocking is effected by rotating the upper bowl portion 12 until the end portions 27 of the pin 26 engage the notched grooves 44, providing what is commonly referred to as a bayonet connection.

A most important feature of this invention comprises the inclusion of means associated with the base 14 to prevent access to the recess 16 of the upper bowl portion 12 by undesired crawling insects such as roaches, centipedes, etc. which would contaminate the food and/or water supply with its droppings and provide a vehicle for the transmission of diseases which such insects would carry. Access also provides the insects with a relatively easy and convenient supply of food and water.

Figure 4:
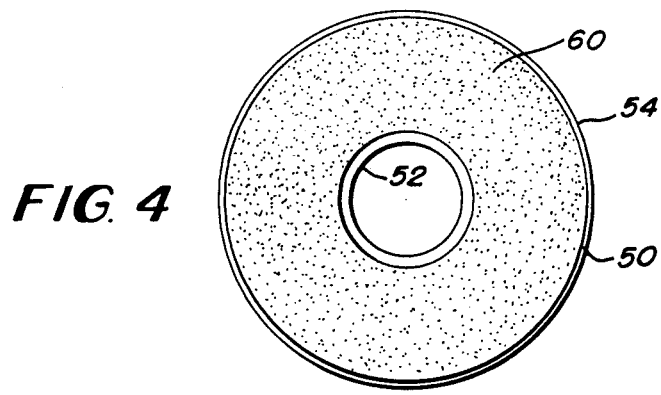
FIG. 4 is a top plan view generally illustrative of the pressure sensitive adhesive disk included in the preferred embodiment for trapping insects seeking to gain access to food and/or water contained in the circular recess formed in the top portion of the embodiment shown in FIGS. 1 and 2.

To this end insects are inhibited, trapped or otherwise blocked by means of a generally flat pressure sensitive annular disk 50 as shown in FIG. 4 having a central circular opening 52 of a diameter equal to or slightly larger than the outside diameter of the female post member 42. The outer diameter of the disk 50 is substantially equal to the diameter of the lower surface 38 so that the perimeter 54 abuts the lower portion of the inner side wall 56. Thus the disk 50 can be placed over the female post member 42 and lies substantially flat on the lower side wall 38 of the recess 36 of the base member.

The invention also contemplates the use of a cylindrical spacer sleeve 58 which is adapted to slide over the outside of the female post member 42 and hold the disk 50 in place on the surface 38 of the base 14. Its length is selected such that it extends up to but does not block the notched grooves 44. Also the length of the pin 26 is selected such that the ends 27 extend outwardly a sufficient distance so that they overlap the top rim 59 of the sleeve 58, thus holding the sleeve 58 in place which in turn also holds the disk 50 in place.

The upper surface of the disk 50 includes an annular area which is coated with a sticky or glue like substance 60 which will trap or at least impede travel of insects thereacross to the sleeve 58 and, in effect, act as a moat to prevent their access to the food and/or water contained in the upper recess 16 of the upper bowl member 12.

In its fabrication when the glue or adhesive 60 is applied to the disk 50, it is topped with a circular sheet of textured paper, not shown, having the same outer diameter so as to protect the integrity of the glue when the disk is being stored or shipped.

Thus during assembly, after tearing off the protective paper sheet from the surface of the disk 50, it is slipped over the face post 42 with its glue side up and allowed to drop to the flat bottom surface 38 of the base 14. Next the sleeve 58 is slipped over the base post member 42 and lastly the upper bowl portion 12 is set into place with the ends 27 of locking pin 26 aligned with the grooves 44 which upon being pressed down and twisted a quarter of a turn clockwise, all the components will be locked into place.

Thus what has been shown and described is an attractive and easily fabricated feeding bowl which prevents crawling insects from entering into the pet's food and/or water supply.

Having thus shown and described what is at present considered the preferred embodiment of the invention, it should be known that the same has been made by way of illustration and not limitation. Accordingly, all modifications, alterations and changes coming within the spirit and scope of the invention are herein meant to be included.

What is claimed is:

1. Apparatus adapted for being placed on a support surface for feeding an animal, such as a pet dog or cat, comprising:

an upper bowl portion including an upper recess therein for receiving food or water;

a lower base portion removably attached to said top bowl portion, said lower base portion including a generally circular recess formed in an upper part thereof;

coupling means secured to said upper bowl portion and said lower base portion interconnecting said upper and lower portions together and elevating the upper bowl portion above the support surface, including a pair of centrally located generally cylindrical post members which telescope together and are respectively secured to said upper bowl portion and said lower bowl portion, said post members comprising a male type post member secured to the underside of said upper bowl portion and a female type post member secured to and located within the recess of the lower base portion;

a generally flat, relatively thin replaceable disk located in the circular recess of said lower base portion, said disk including an annular moat region of generally sticky material on the outer surface thereof surrounding said coupling means for inhibiting the travel of crawling insects across said annular region and thus preventing the insects from gaining access to the upper bowl portion;

a cylindrical sleeve fitted over said female post member abutting said disk and holding said disk in place in said recess of the lower base portion;

means locking said male and female post members together including an elongated pin extending through and outwardly from said male post member a predetermined distance to provide a pair of exposed end portions and a pair of notched grooves in the top portion of said female post member, said end portions removably engaging said notched grooves to thereby provide a bayonet type of connection, said end portions also retaining said cylindrical sleeve adjacent the disk and thereby holding the disc within the circular recess.

2. The apparatus as defined by claim 1 and additionally including a spring loaded plunger within said female post member for engaging and applying an upward bias to said male post member when in engagement therewith.

3. The apparatus as defined by claim 1 wherein said base portion includes a flat circular lower support surface and a generally concave side wall extending upwardly from said lower support surface to define said annular recess.

4. The apparatus as defined by claim 3 and wherein said upper bowl portion comprises a bowl structure including a generally flat side wall surface extending downwardly and outwardly from said upper recess to a bottom edge which defines a generally flat bottom surface.

* * * * *